Jan. 17, 1967   W. GREBOW ETAL   3,298,300
SAFETY TOP FOR TOASTERS

Filed May 3, 1965   2 Sheets-Sheet 1

INVENTORS
WOLFE GREBOW
STANLEY GINSBURG
BY John B. Dickman III
AGENT

Jan. 17, 1967  W. GREBOW ETAL  3,298,300
SAFETY TOP FOR TOASTERS
Filed May 3, 1965  2 Sheets-Sheet 2

INVENTORS
WOLFE GREBOW
STANLEY GINSBURG
BY John B. Dickman III
AGENT

United States Patent Office 3,298,300
Patented Jan. 17, 1967

1

3,298,300
SAFETY TOP FOR TOASTERS
Wolfe Grebow, 8402 Carlson Lane, Baltimore, Md. 21207, and Stanley Ginsburg, 777 Washington Blvd., Baltimore, Md. 21230
Filed May 3, 1965, Ser. No. 452,545
1 Claim. (Cl. 99—337)

This invention relates to improved safety means for electric toasters, and more particularly to a detachable or replaceable safety top which may be secured on top of an electric toaster either by screw means or by a plurality of spring fingers insertable in the slice of bread receiving openings in the top of the toaster.

An object of the invention is to provide an improved safety top for electric toasters which when positioned on top of an electric toaster will prevent a child or other persons from inserting a fork or implement into the heating coil area of the toaster, thereby making the toaster shock and burn proof, while permitting the intended use of making toast.

Another object of the invention is to provide an improved safety top closure for electric toasters which will not only make the same shock and burn proof while operating, but will serve to retain the heat in the toaster, thus making the same more efficient than toasters having no safety or top closures.

A further object of the invention is to provide an improved safety top closure for electric toasters, which due to the top closure will result in a saving of electricity.

A still further object of the invention is to provide a top closure as described which can be placed on the toaster at the factory, or applied to existing toasters now in use.

A still further object of the invention is to provide an improved safety top closure for an electric toaster which will be highly efficient in operation, and relatively inexpensive to manufacture and produce.

Other objects will appear as the description proceeds.

In the accompanying drawings which form a part of my application:

Figure 3:
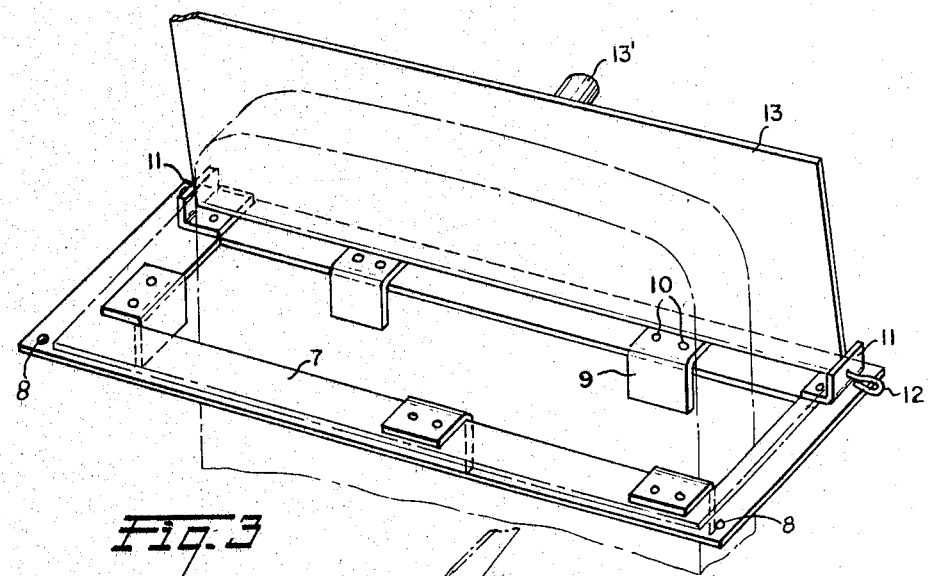
Figure 4:
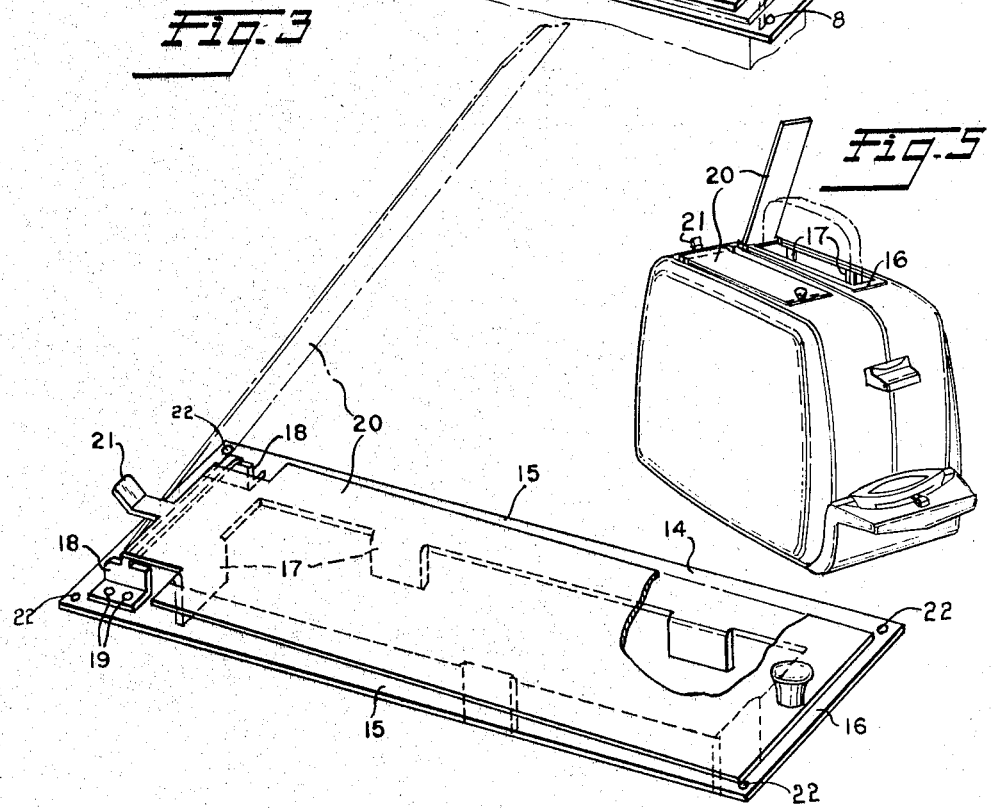

FIGURE 3 is a perspective view of the safety top closure with an open end support base with pivoted closure extending longitudinally of the toast receiving openings, and FIGURE 4 is a perspective view of a modified form of safety top closure with the support base closed on the opposite sides and ends, and with the closure member pivoted thereon transversely of the slice of bread receiving opening in the toaster.

Figure 5:
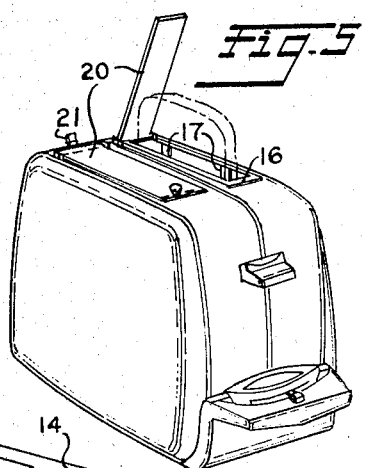

FIGURE 5 is a perspective view of a toaster showing the device of FIGURE 4 in position thereon.

Like characters of reference are used throughout the following specification and the accompanying drawings to designate corresponding parts.

The electric toaster illustrated in the drawings comprises a housing generally denoted by the reference numeral 1 with opposite sides and ends 2 and 3, respectively, and a top 4 provided with bread receiving openings 5 and 6.

Figure 1:
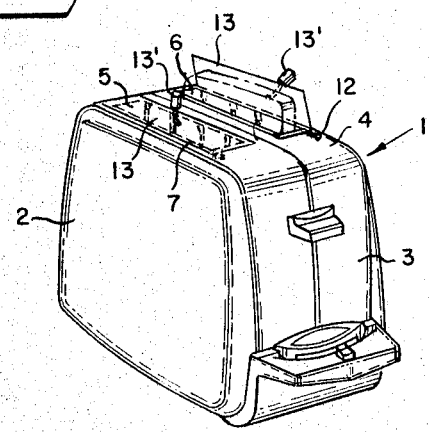
FIGURE 1 is a perspective view of an electric toaster with one form of safety top closure attached to the top of the toaster.
Figure 2:
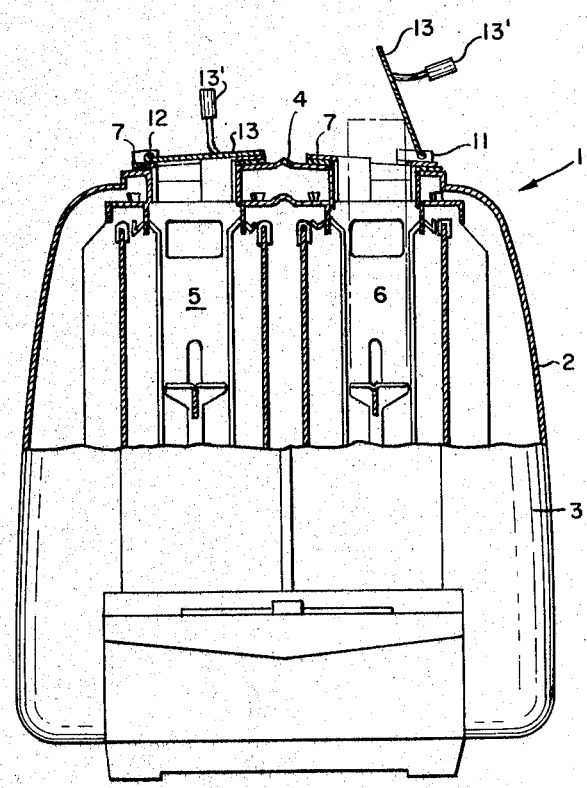
FIGURE 2 is an end view, partially broken away and in section, showing the electric toaster with safety top closure thereon as in FIGURE 1.

In FIGURES 1, 2 and 3, there is shown a safety top

2 closure for electric toasters having a base member 7 of rectangular shape. Apertures 8 are provided in the corners of the base member for attachment by screws to the toaster 1 if desired. A plurality of right angle depending spring attaching FIGURES 9 are either formed integrally with the sides and end of the base member 7, or are affixed thereto by means of rivets 10 or other desired instrumentalities. A pair of angular upstanding bearing ears 11 are secured to the opposite ends of one of the sides of the base member 7 and serve as bearing means for the pintle 12 attached to the longitudinally pivoted closure or plate 13, which will be raised by means of handle 13′ for dropping a slice of bread into the slice of bread receiving opening of the toaster, and which will automatically fall into place over said opening and close said bread receiving opening while said slice of bread is being toasted, thereby providing positive means for preventing a child or other person from inserting a fork, knife or other implement into the bread receiving opening 1, thus preventing electric shock or burns to the child or other persons. The reason the plate or closure automatically falls into place when the handle 13′ is released, is due to the fact that the device is made so that the closure can never assume a vertical position, its upward swing is limited to about an 80° angle from the horizontal, and will fall into the closed position by gravity as soon as released.

In FIGURE 4 of the drawings, there is shown a base member 14 closed at its opposite sides and ends 15 and 16, respectively. A plurality of depending spring attaching fingers 17 are formed integrally with the base member and are adapted to be inserted within the slice of bread receiving opening to secure the safety top on the top of the toaster. Bearing ears 18 will be attached by rivets 19 or other means to the opposite sides of the base member at one end thereof to pivotally support the end mounted closure member or plate 20, which will be provided with an integral operating handle 21 at its pivoted end. Screw holes 22 are formed in the frame member for permanent attachment by screws to the toaster if desired.

In FIGURE 5 of the drawings, the device of FIGURE 4 is shown in position on the toaster, one opening being covered, the other showing the toasted slice of bread lifting the top after the toasting cycle has been completed and before being removed by the consumer.

Thus, it will be seen that the safety top closures when installed on an electric toaster over the slice of bread receiving openings will prevent accidents by electric shock or burns, and will serve to more efficiently operate the toaster while effecting a savings in the cost of electricity for operating the same.

Having thus described our invention, what we claim as new and desire to secure by Letters Patent of the United States is:

An electric toaster having bread receiving openings in the top thereof and internal heated coils in combination with removably mounted safety closures for each of said openings, each of said closures comprising a rectangular, open frame member having depending spring fingers mounted thereon which are adapted to frictionally and removably engage the walls of the bread receiving openings and a pivotally mounted plate mounted on the upper surface of said frame which when in an open position will permit the insertion of bread into the toaster and when in a closed position will prevent insertion of foreign articles such as a fork into the electrically heated coils of the toaster.

References Cited by the Examiner
UNITED STATES PATENTS

| | | | |
|---|---|---|---|
| 1,720,800 | 7/1929 | Morrison | 99—401 X |
| 1,997,192 | 4/1935 | Kasamis. | |
| 2,194,859 | 3/1940 | Malmquist et al. | 99—328 |
| 2,268,675 | 1/1942 | Scharf | 99—337 |
| 2,320,951 | 6/1943 | Russell | 99—389 X |
| 2,502,655 | 4/1950 | Kitto | 99—329 |
| 3,140,344 | 7/1964 | Slater et al. | 339—44 X |

BILLY J. WILHITE, *Primary Examiner.*